March 10, 1953     H. W. SACHS     2,630,875
BACKWATER VALVE
Filed Feb. 3, 1950     3 Sheets-Sheet 1
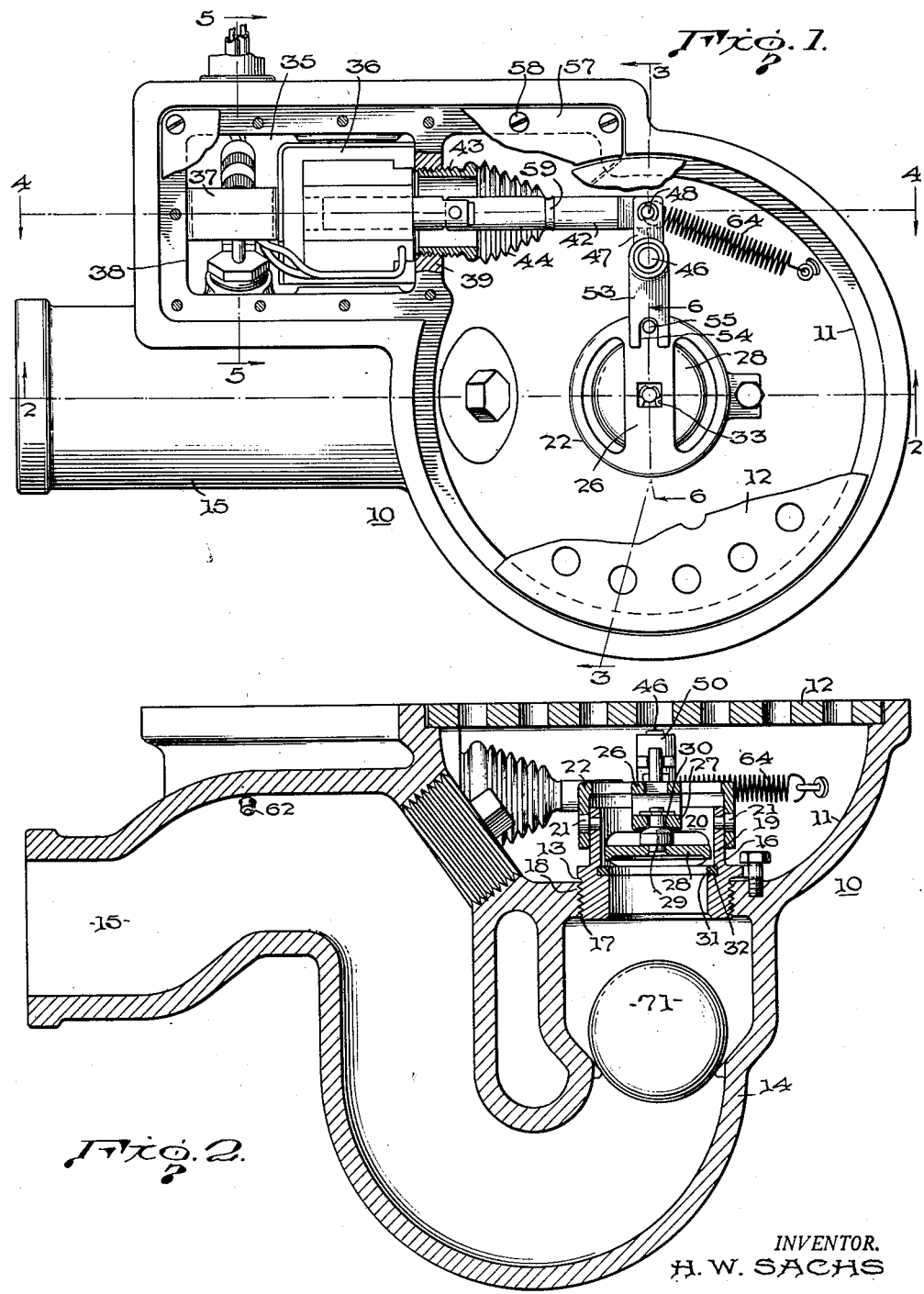
INVENTOR.
H. W. SACHS
BY Estabrook & Estabrook
his ATTORNEYS March 10, 1953 H. W. SACHS 2,630,875
BACKWATER VALVE Filed Feb. 3, 1950 3 Sheets-Sheet 2

INVENTOR.
H. W. SACHS
BY Estabrook & Estabrook
his ATTORNEYS

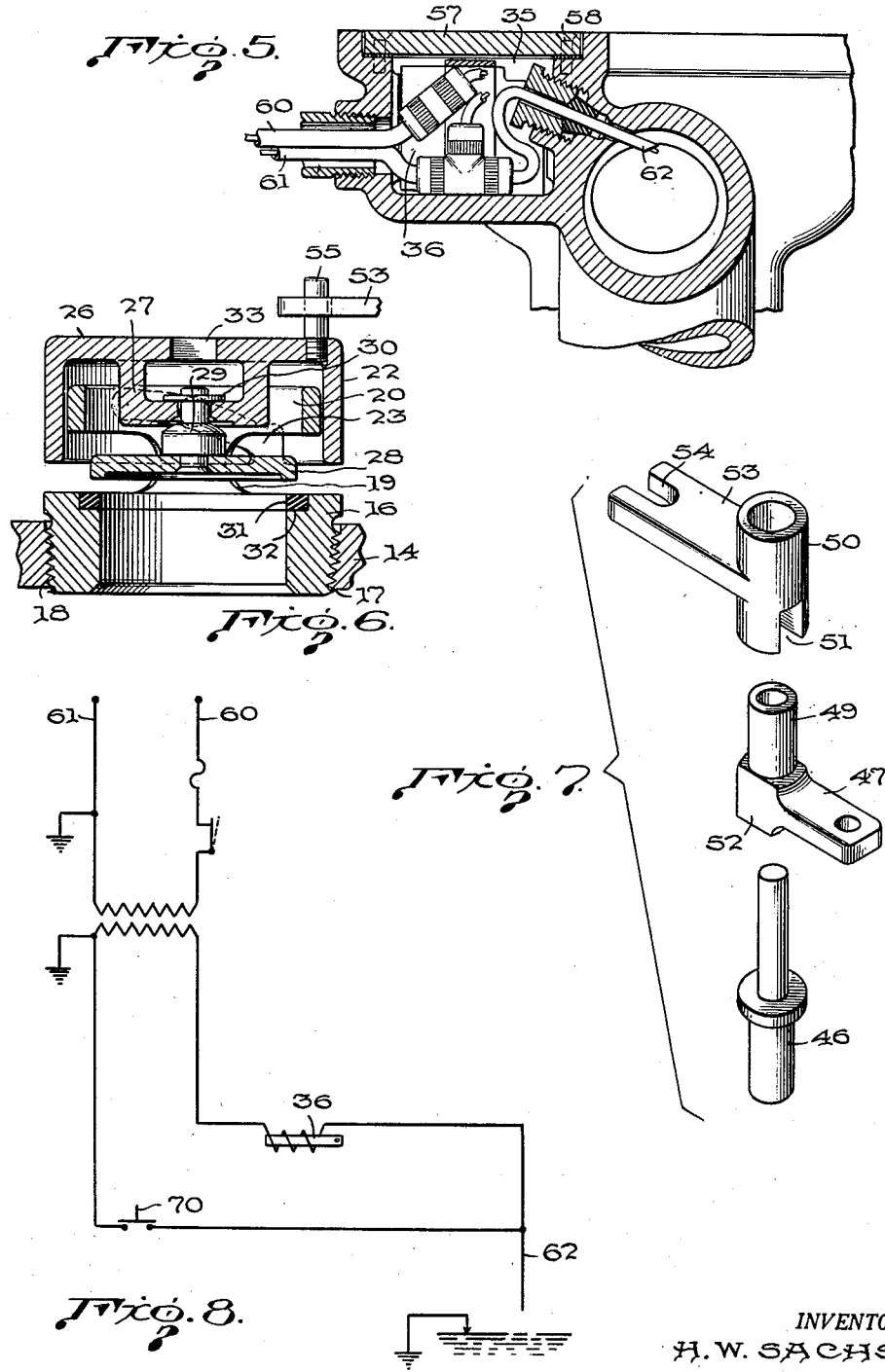

Patented Mar. 10, 1953

2,630,875

UNITED STATES PATENT OFFICE 2,630,875

BACKWATER VALVE

Hans W. Sachs, Binghamton, N. Y.

Application February 3, 1950, Serial No. 142,278

6 Claims. (Cl. 182—15)

This invention relates to back water valves for drains and particularly for use in connection with the drains leading to the city sewage lines.

An object of the invention is to overcome and prevent the backing up of water and sewage from the city line into the basement of a house or any industrial installation. In many installations when the city lines are overtaxed by heavy rains and the like this sewage water tends to back up into the lines leading to a residence and floods the basements. Many devices have been provided to overcome this problem, but they have not all been satisfactory either due to leakage around the valves or causing the valves to stick so they will not return to their normal positions resulting in many instances where the basements have been flooded.

It is therefore the purpose of this invention to provide means for overcoming these objections and to provide automatic means which will be initiated upon the rise of water to cause a valve to be seated and held in such position until this emergency condition has been remedied, whereupon the valve will be caused to return to its normal and open position and allow the drain to perform its normal function.

This invention consists in providing a back water valve which may be associated with a drain pipe, a floor drain or a floor drain trap and may be manually operated, or automatically by means responsive to the rising or backing up of the water in the sewer pipe or floor drain so that the valve upon the rise of the water will immediately be closed and remain in such position until the liquid recedes, whereupon the valve will be brought to open position.

The invention consists of certain novel features of construction and combinations of parts which will be hereinafter more particularly described and set forth in the claims.

In the accompanying drawings:

Fig. 1 is a top plan view showing the invention applied to a floor drain with the grating cover and cover for the solenoid removed.

Fig. 2 is a view in vertical section on the line 2—2 of Fig. 1.

Fig. 5 is a detailed view in vertical section showing probe wire or contact extending into the trap of the floor drain.

Fig. 6 is a vertical sectional view of the valve.

Fig. 7 is a view in perspective, showing the pivot pin and valve operating arms disassembled; and Fig. 8 is an electrical diagram for the solenoid and probe wire.

Figure 3:
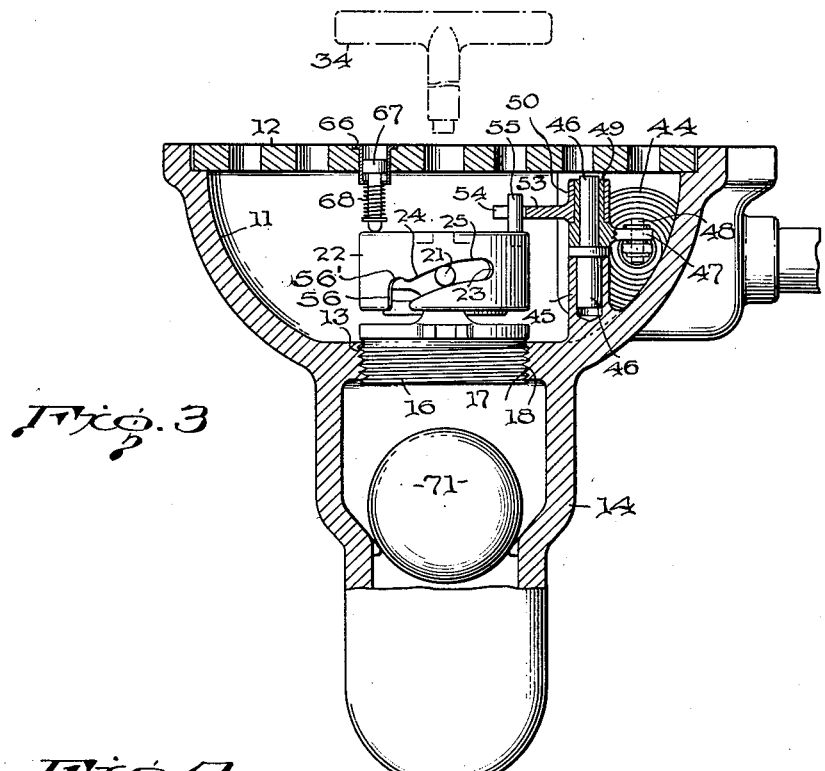
Fig. 3 is a vertical sectional view on line 3—3 of Fig. 1.
Figure 4:
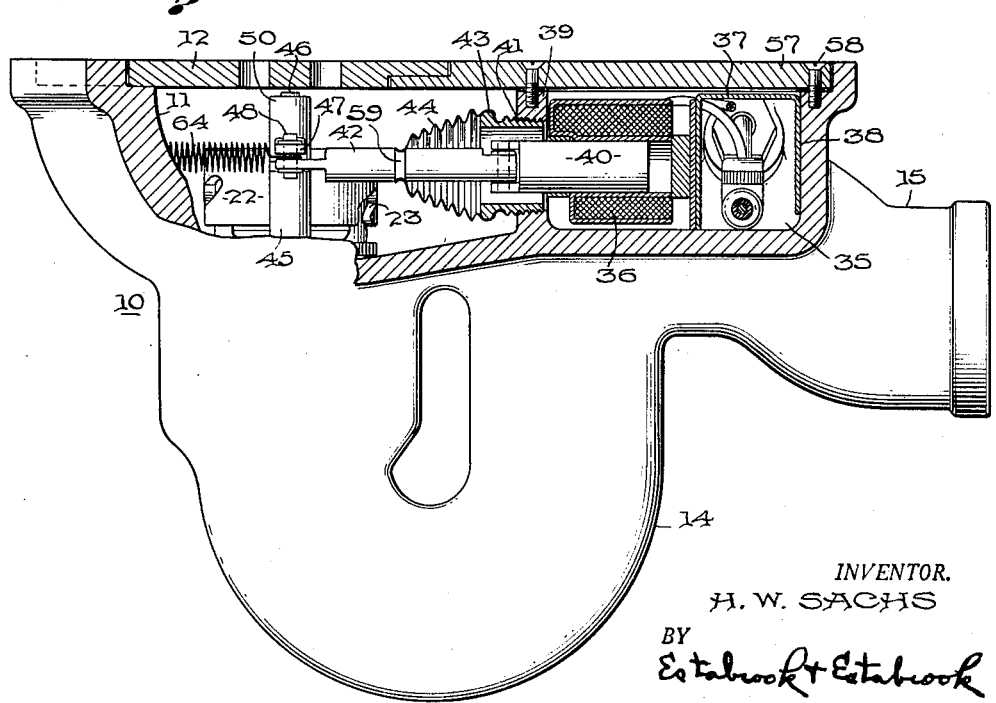
Fig. 4 is a view partly in elevation and partly in vertical section on line 4—4 of Fig. 1.

As illustrated in the drawings, the invention is shown applied to a floor drain 10 of the type that comprises a basin 11 which is usually embedded in a floor, and provided at its upper end with a removable grille or grating 12. The basin or bowl 11 is provided with an opening 13 in the bottom thereof which communicates with a trap or drain pipe 14. This trap is generally of U-shaped configuration and terminates at its outlet end in a tubular extension 15. The floor drain 10 is in most respects similar to floor drains in general use.

A valve body 16 in the form of a sleeve is provided on its outer surface with screw threads 17 which engage like threads 18 in the outlet opening 13 in the bottom of the basin or bowl 11 for securing the valve to the basin. Extending upwardly from the upper portion of the valve body are two oppositely disposed arcuate shaped webs or flanges 19 which are connected together at their upper ends by an annular band 20. Extending laterally and outwardly from each of the webs or flanges 19 is a stud 21. Encircling the webs 19 and annular band 20 is a valve ring 22 which is capable of having free movement with respect to the annular band 20 and webs. Formed in the wall of the ring 22 are two bayonet slots 23—23 which are preferably arranged diametrically opposite one another and spaced 180° apart. The bayonet slots 23 are open at the lower edge or bottom of the ring 22 and receive the studs 21 of the valve body for connecting valve ring to the valve body. The bayonet slots are formed with camming surfaces of a decided pitch as at 24 to effect a drop of the valve ring when rotated clockwise or a rise when turned counter-clockwise and these slots are provided with a section of smaller pitch at their upper ends as at 25 to further drop the ring slowly when approaching its seating position. A shoulder or stop 56 is provided at the lower end of each slot 23, opposite its open end and on the upper wall of the slots, which serves to hold the valve ring 22 and valve 28 in open position by the engagement of the studs 21 with the shoulders 56. As the ring 22 is rotated manually or automatically the studs 21 will engage the shoulders 56 at the open ends of the slots preventing further rotation of the ring, and the studs 21 will support the ring 22 by their engagement with the shoulders 56 and upper walls of the slots 23, which are recessed at 56'.

A bar 26 extends across the top of the ring 22 and extending downwardly within the ring from the bar 26 is a bracket 27. A valve disk 28 provided with a valve stem 29 is attached to the bracket 27 by the stem passing through an opening formed in the bracket and held thereto by retaining ring or key 30. The valve 28 is capable of having free rotation with respect to its supporting bracket 27 and is adapted to be brought into engagement with a valve seating ring 31 which is preferably made of rubber and cemented in a recess 32 formed in the inner wall of the valve body 16. The bar 26 is provided with a suitably shaped opening 33 for the reception of a tool 34, which conforms to the opening 33, shown in dotted lines in Fig. 3, whereby the ring may be operated manually in seating and unseating the valve. The normal position of the valve 28 is in unseated or open position, and can be operated by tool 34 without removing grating 12.

Arranged at one side of the basin or bowl 11 is a compartment 35 in which is mounted a solenoid 36 which is held in place by means of a U-shaped spring clip 37. A portion of the clip engaging an outer wall 38 of the compartment and its opposite end or portion engaging the solenoid and urging it against the inner wall 39 of the compartment. A cover 57 closes the solenoid compartment and is held in place by means of screws 58. The solenoid is provided with an armature or plunger 40 which extends through an opening 41 in the inner wall 39 and pivotally connected to the outer end of the plunger is a link 42. A bushing 43 has screw threaded connection with the opening 41 of the wall 39, and surrounds the plunger. Connected to the bushing and to the link 42 is a flexible bellows 44 for forming a water tight seal to prevent liquids or moisture entering the solenoid chamber or compartment. The ends of the bellows 44 are of a character that permits the ends to be snapped over the enlarged or outer end of the bushing 43 and into the groove 59 in the link 42.

A socket 45 is provided in the basin or bowl 11 for the reception of a removable pivot pin 46. A lever 47 is mounted for free rotation upon the pin 46 and the free end of the arm is connected to the link 42 by a pin 48. The lever 47 is provided with a tubular extension 49 through which the pin 46 extends and mounted on the tubular extension 49 is a sleeve 50. The sleeve 50 is provided with a transverse slot 51 which has flat or straight walls for engaging similar walls 52 of the lever 47 so that the lever 47 and sleeve 50 may rotate as a unit. The sleeve 50 is provided with a laterally extending arm 53 which is bifurcated or forked at its outer end as at 54 for the reception of stud 55 on the valve ring 22.

The solenoid 36 is connected in any suitable manner to a source of electric supply by means of wires 60 and 61. Arranged in the circuit for the solenoid is a probe wire or contact 62 which extends into the trap 14, and preferably adjacent the upper wall of the tubular extension 15, so that as the water rises in the trap or tends to back flow into the trap the water or liquid will engage the probe wire or contact 62 completing the circuit and energizing the solenoid to cause the plunger 40 thereof to be retracted and operate the lever 47. The lever 47, in turn, would cause the arm 53 to rotate the valve ring 22 and move the ring downwardly on the valve body 16 for seating the valve 28 and prevent any liquid or water from entering the floor drain or basin 11. As the water recedes from the trap 14 and the probe wire contact 62 is no longer immersed, the circuit would be broken and the solenoid de-energized.

A spring 64 is connected to the basin or bowl 11 and to the pin 48 connecting the lever 47 with the link 42. The spring, upon the solenoid being de-energized will exert a force upon the pin 48 for rotating the lever 47, arm 53 and valve ring 22 in a counter-clockwise direction, as viewed in Fig. 1. The rotation of the ring 22 in a counter-clockwise direction will cause the ring to move vertically with respect to the valve body 16 by reason of the slots 23 and studs 21. This vertical movement of the ring 22 will lift the valve 28 from its seat 31 and thereby form a communication between the basin 11 and the trap or drain 14. The function of spring 64 is not to hold the valve in open position, but simply to move it to open position on the de-energizing of the solenoid.

The camming grooves or slots 23 are effective in causing the valve 28 to be seated or unseated. The camming grooves 23 have a section 24 of greater pitch to effect drop of the valve ring 22 when rotated clockwise, or a rise when turned counter-clockwise, and a section 25 of smaller pitch to further drop the ring 22 slowly when approaching seating position of the valve 28. The cam section 25 having the smaller pitch has an angle whose tangent is smaller than the coefficient of friction for the materials involved, and therefore will be self locking and not permit the valve ring 22 to back off under pressure against the valve 28. The two camming grooves 23 must be alike within close tolerances and juxtaposed by exactly 180°. A turn of the valve ring 22 of less than 60° would cause the valve 28 to move from full open position to full closed position, and similarly in moving the valve 28 to open position.

Extending through the grating or grille 12 is a ferrule or sleeve 66 in which is received a knurled indicator button 67. This button extends into the basin or bowl 11 for engagement with the upper surface of the valve ring 22 and is urged in the direction of the valve ring by a spring 68. As illustrated in Figure 3, this button indicates that the valve ring has been moved to a position wherein the valve 28 is in a partially closed position; however, when the button has reached its lowest position of movement in the ferrule 66 it will indicate to an observer that the valve 28 is in closed position and resting on the seat 31. When the button is lying flush with the upper surface of the grille 12 it indicates that the valve 28 is in its full open position. To determine if the solenoid is functioning to operate the valve 28 a push button switch 70 is provided in the circuit shown in Figure 8, for completing the circuit and energizing the solenoid. If the solenoid fails to operate the ring 22 upon making this test it will indicate that there is some failure in the electric system. The switch 70 may be manually operated for causing the solenoid to be energized and thereby operate the valve.

From the foregoing it will be apparent that the valve 28 is normally in an open position and in case the water in the trap reaches an elevation to engage the contact 62 the electric circuit would be completed and the solenoid 36 energized for operating the plunger or armature 40 and thereby cause the link 42 to oscillate the lever 47, sleeve 50, arm 53, and valve ring 22. The rotation of the valve ring on the valve body 16 will cause an engagement between the studs 21 and the slots or grooves 23 of the valve ring for moving the valve ring downwardly, and as the valve 28 is carried by the ring 22 the valve will be seated upon its seat 31 closing the opening 13 in the trap 14 and preventing any liquids from entering the basin or bowl 11 of the floor drain and passing through the grille 12 into the room. When this emergency condition passes and there is no contact or engagement between the contact 62 and liquid in the trap the solenoid would become de-energized and the spring 64 would return the lever 47 and arm 53 to their normal position and cause the valve ring 22 to be rotated and elevated for raising the valve 28 from its seat 31.

Should occasion demand, due to sediment or other foreign matter entering the trap or floor drain and affecting the operation of the parts, access may readily be had to the valve and other parts by removing the grating or grille 12, whereupon the valve ring can be readily disconnected from the valve body and all parts readily cleansed or adjusted. Likewise, the sleeve 50 and arm 53 may be lifted from tubular extension 49 of lever 47. Thereupon the valve ring 22 may be disengaged from the studs 21, so that the interior of the valve is made accessible so that cleaning tools may be introduced when necessary into the trap 14.

In this device the critical valve seating surfaces are located in the precise area of high liquid velocity which prevails whenever the drain serves its purpose of carrying liquids away which flow into basin 11. This high liquid velocity will tend to wipe clean the seating surfaces of the valve disk 28 and seating ring 31, thereby preventing the accumulation of deposits which interfere with the tight closing of the valve.

A float valve 71 is provided to check back flow in instances where the valve does not immediately function.

I claim:

1. A back water valve for drains, comprising a floor drain having an opening therein for communication with a drain pipe, a valve body fitted to said opening of said floor drain and provided with a valve seat, a valve ring mounted on said valve body for vertical movement with respect to said valve body, said valve ring being provided with a valve, a solenoid for moving said valve ring on said valve body for seating said valve to said valve seat, an electric circuit for said solenoid having circuit closing means in said drain for engagement by liquid backing up in said drain for completing said circuit and causing said solenoid to be energized for operating said valve ring and means for moving said ring to cause said valve to be unseated.

2. A back water valve for drains, comprising a floor drain having a trap, a valve body disposed between said floor drain and trap provided with a valve seat, a rotatable ring on said valve body provided with a valve, studs on said valve body, said ring having cam slots therein for the reception of said studs for guiding said valve from and to said valve seat, a pivot pin mounted in said floor drain, a lever rotatable on said pivot pin, an arm mounted on said lever for movement therewith and having engagement with said ring, and means for operating said lever to rotate said ring.

3. A back water valve for drains, comprising a floor drain having a drain pipe, a valve body disposed between said floor drain and drain pipe provided with a valve seat, a rotatable ring on said valve body provided with a valve, studs on said valve body, said ring having cam slots therein for the reception of said studs for guiding said valve from and to said valve seat, a pivot pin mounted in said floor drain, a lever rotatable on said pivot pin, a sleeve mounted on said lever and connected thereto for movement therewith, and provided with an arm having engagement with said ring, and means for operating said lever to rotate said ring.

4. A back water valve for drains, comprising a floor drain having an opening therein for communication with a drain pipe, a valve body fitted to said opening of said floor drain and provided with a valve seat, a valve ring mounted on said valve body for vertical movement with respect to said valve body, said valve ring being provided with a valve, a solenoid, means pivotally mounted in said drain for connecting said solenoid and valve ring for operating said valve upon the energizing of said solenoid, an electric circuit for said solenoid having circuit closing means in said drain for engagement by liquid backing up in said drain to complete said circuit and causing said solenoid to be energized for operating said valve ring and valve.

5. A back water valve for drains, comprising a floor drain having an opening therein for communication with a drain pipe, a valve body fitted to said opening of said floor drain provided with a valve seat, a rotatable ring on said valve body provided with a valve, studs on said valve body, said ring having cam slots therein for the reception of said studs for guiding said valve from and to said valve seat, said cam slots being open at the lower edge of said ring and formed with a steep pitch section throughout a portion of their length to effect quick opening and closing of said valve, and having a low pitch section at the opposite end thereof from said open end to hold said valve in seated position, and stop means at the open end of each cam slot engaged by said studs for holding the valve in open position, a solenoid for operating said valve ring, an electric circuit for said solenoid having circuit closing means in said drain for engagement by liquid backing up in said drain for completing said circuit and causing said solenoid to be energized for operating said valve ring and valve.

6. A back water valve for drains, comprising a floor drain having an opening therein for communication with a drain pipe, a valve body fitted to said opening of said drain and provided with a valve seat, a valve ring mounted on said valve body for movement with respect thereto, said valve ring having a valve, a solenoid for operating said valve ring, an electric circuit for said solenoid having circuit closing means in said drain for engagement by liquid backing up in said drain for completing said circuit and causing said solenoid to be energized for operating said valve ring, and a spring for moving said valve ring in an opposite direction to the movement imparted to said valve ring by said solenoid.

HANS W. SACHS.

REFERENCES CITED

The following references are of record in the file of this patent:

UNITED STATES PATENTS

| Number | Name | Date |
| --- | --- | --- |
| 1,049,845 | Geissinger | Jan. 7, 1913 |
| 1,139,647 | Dehn | May 18, 1915 |
| 1,644,171 | Caldwell | Oct. 4, 1922 |
| 2,348,097 | Smith | May 2, 1944 |